3,313,592
PROCESS OF PARCHMENTIZING CELLULOSE WITH AN AQUEOUS SOLUTION OF BORON TRIFLUORIDE AND A STRONG ACID
James M. Canon, Shaker Heights, and Daniel D. Bell, Fairview Park, Ohio, assignors to The Harshaw Chemical Company, Cleveland, Ohio, a corporation of Ohio
No Drawing. Filed Oct. 21, 1963, Ser. No. 317,783
10 Claims. (Cl. 8—119)

ABSTRACT OF THE DISCLOSURE

This invention comprises a process and the solution used in the process of modifying a cellulose-containing material comprising the steps of treating the cellulose-containing material with a solution comprising boron trifluoride, water and a strong acid, and subsequently contacting the so-treated material with water, the solution used in the initial treatment advantageously containing hydrofluoric acid, sulfuric acid or phosphoric acid as the said strong acid.

---

This invention relates to a process and composition for modifying cellulose to improve its appearance and/or physical properties. More particularly the present invention relates to the use of boron trifluoride in combination with a strong acid for treating cellulose or cellulose-containing materials.

It has been known to treat cellulose materials, particularly cellulose fabrics or mats, with strong boron trifluoride solutions to improve their appearance and/or physical properties (U.S. Patent 2,554,439). It is disclosed therein that strong aqueous solutions of boron trifluoride may be used to "singe," parchmentize, or regenerate cellulose fabrics and felted products including floc, fibers, yarns, filaments, and paper.

It is also known that certain strong acids, particularly sulfuric acid, may be used in the treating of cellulose materials particularly paper for the parchmentizing thereof. Other acids including hydrofluoric acid and phosphoric acid have also been investigated for reactions with cellulose. Hydrofluoric acid was tested and considered to be unsuitable for the parchmentizing of paper. See for example, "Zellstoff und Papier," Cellulose and Pergamentierungsmittel, by Dr. E. Becker, No. 7, July 1939.

It has now been discovered that any well known strong acid can be used effectively with additions of boron trifluoride in the parchmentizing and otherwise treating of cellulose materials, particularly those in fibrous form such as paper and the like. The fact that boron trifluoride acts synergistically at certain concentrations with a strong acid in the treatment of cellulose materials is completely unexpected in view of the fact that many strong acids manifest little if any effect, chemically or physically, on cellulose. Moreover, boron trifluoride when used as the sole active ingredient in the treatment of cellulose (see U.S. Patent 2,554,439 supra), must be present in strong concentration extending over a rather narrow select range. It is also an advantage of the present invention to add small amounts of boron trifluoride to strong acids which are good parchmentizing agents such as sulfuric acid; the effectiveness of the sulfuric acid is increased.

In the present process, boron trifluoride can be used effectively at concentrations much below the minimum prescribed in the prior art and when used in said select concentrations with certain of the strong acids, particularly sulfuric acid, hydrofluoric acid and phosphoric acid, increase the strength of cellulose products above that obtainable from any previously known agents; the cellulose products may be improved as much as 30 percent over that obtainable from solutions containing boron trifluoride or a strong acid as the sole active ingredient. Moreover, the fact that the boron trifluoride can be diluted significantly or otherwise blended with a strong acid to form excellent parchmentizing solutions is of considerable advantage because boron trifluoride is not stable in aqueous solutions having less than about 57 percent (25 mole percent) by weight boron trifluoride and more than about 67 percent (33⅓ mole percent) boron trifluoride. Additionally it is of considerable advantage to use as little boron trifluoride (7–10 percent) as possible because of its expense.

The treating solutions of the present invention may be prepared by blending boron trifluoride with the acid and water in any order with no apparent difference in result. Well known boron trifluoride-acid adducts may be prepared (see for example D. R. Martin and J. M. Canon, "Coordination Compounds of Boron Halides" in Friedel-Crafts and Related Reactions by G. S. Olah, Interscience, Landon, pp. 431–3, 1963) and blended with water. The phosphoric acid adducts disclosed are advantageously blended with minor amounts of water (10 percent to 30 percent) to form treating solutions which may be used according to the teachings of the present invention.

The invention is conveniently carried out by providing a solution comprising water, boron trifluoride and a strong acid, contacting the cellulosic material to be treated with the solution and subsequently washing or otherwise contacting the treated cellulosic material with water. The process of the invention conveniently is carried out at room temperature with a contact time as short as 5 seconds and which preferably may range from about 10 seconds to about 15 seconds. Contact times in excess of two hours are undesirable in that the cellulosic material starts to decompose. If the cellulosic material is wetted with water prior to contacting the material with the parchmentizing solution, the contact times will have to be increased accordingly. The adjusting of these contact times will partly depend on the type of material being treated and may easily be worked out by those skilled in the art.

Temperatures other than room temperature also may be used with the instant process. They are not critical as such and only change reactivity of the solution which in turn necessitates an adjusting of the contact times. Preferably, temperatures in the range from about —5° C. to about 34° C. are employed. The temperatures on either side of the range may be used and are considered to be within the scope of the present invention. Temperatures of 50° C. or higher may be used also but there is no apparent advantage observed in conducting the process at elevated temperatures. Moreover, the process effectively may be conducted with solutions approaching the freezing point thereof.

It is important that the cellulosic material be washed or otherwise contacted with water to complete the actual parchmentizing or other similar effect after being contacted with the treating solutions. It is preferred that the water be free from excessive amounts of acid and boron trifluoride contamination but good working may be effected with water containing up to 10 percent contamination or higher.

Not only is there always an improvement in the strength of the cellulose material being treated according to the present invention but there is a noticeable improvement in the wet strength of felted cellulose products in the form of sheets, mats, or batting, and the like. The wet strength of paper treated with preferred solutions of the present invention is increased as much as 25 times and in some instances as much as 50 times compared to the original strength of the paper.

As indicated hereinbefore, it is of advantage to add various amounts of boron trifluoride to sulfuric acid to provide low cost parchmentizing solutions. Sulfuric acid solutions having boron trifluoride present are uniformly better parchmentizing agents than sulfuric acid alone.

Solutions of the present invention advantageously containing both sulfuric acid and boron trifluoride include those comprising from about 5 percent to about 68 percent sulfuric acid, from about 75 percent to about 7 percent boron trifluoride, and from about 12 percent to about 40 percent water. The range of concentrations of hydrofluoric acid with boron trifluoride is not as expansive as that for sulfuric acid. In accordance with the present invention, hydrofluoric acid may be advantageously employed with boron trifluoride in parchmentizing solutions comprising from about 50 percent to about 60 percent boron trifluoride, from about 8 percent to about 12 percent hydrofluoric acid, and from about 32 percent to about 39 percent water.

In order that those skilled in the art may better understand how the present invention can be carried into effect, the following examples are given by way of illustration and not by way of limitation. All parts and percentages are by weight unless otherwise stated.

*Example I*

Strips of filter paper 9 cm. by about 1.3 cm. cut lengthwise along the grain of the paper are dipped (entirely submerged) into a solution at room temperature comprising 55 percent boron trifluoride, 7 percent hydrofluoric acid, and 38 percent water. The filter paper is removed from the solution after 10 seconds, washed with water and dried. The resulting strips are tested for tensile strength using a Fruhling-Michales testing machine modified by replacing the original holder with two clamps and counterbalancing the beam so that the only weight applied was that of lead shot in the bucket. (For a description of this tester, see Deutsche Normen, D.I.N. 1164, Seite 7, par. 64, BFP 0.5.) Each strip of paper is held in the two clamps and the lead shot is poured slowly into the bucket from a beaker at a low rate until the paper tears. The shot in the bucket is then weighed. The machine is set at its 10–1 ratio so that the force on the paper is 10 times the weight of the shot. When compared with the untreated filter paper, the treated samples average out to have an increased dry strength of greater than three times the dry strength of the untreated samples. The wet strength of the treated samples compared to the wet strength of the untreated samples is about 20 times as great.

*Example II*

Example I is repeated using a solution comprising 46 percent sulfuric acid, 22 percent boron trifluoride and 32 percent water. The treated samples are found to have a tensile strength 3.4 times the strength of the untreated samples. When wet, the treated samples are found to have an increase in strength of about 25 times that of the untreated samples.

*Example III*

Repeating Example I using a solution containing 50 parts boron trifluoride and 50 parts 85 percent phosphoric ($H_3PO_4$), filter paper samples are made having an average dry strength of about 2.5 times that of the untreated filter paper.

*Example IV*

Repeating Example I using a solution containing about 7 percent boron trifluoride, about 40 percent water and 53 percent sulfuric acid, filter paper samples are made having an average dry strength of about 2.5 times that of the untreated filter paper.

*Example V*

Repeating Example I using a solution containing about 7 percent boron trifluoride, about 25 percent water and 68 percent sulfuric acid, filter paper samples are made having an average dry strength of about 2.5 times that of the untreated filter paper.

*Example VI*

Repeating Example I using a solution containing about 55 percent boron trifluoride, about 40 percent water and 5 percent sulfuric acid, filter paper samples are made having an average dry strength of about 2.5 times that of the untreated filter paper.

*Example VII*

Repeating Example I using a solution containing about 75 percent boron trifluoride, about 20 percent water and 5 percent sulfuric acid, filter paper samples are made having an average dry strength of about 2.5 times that of the untreated filter paper.

When cotton thread is treated with the solutions of Examples I or II, its strength is increased significantly over that of the original material.

While specific examples of the invention have been set forth hereabove, it is not intended that the invention be limited solely thereto, but to include all of the variations and modifications falling within the scope of the appended claims.

What is claimed:

1. A process of modifying and treating a cellulose-containing material comprising bringing said material into contact with a solution comprising boron trifluoride, water and a strong acid and subsequently contacting said treated material with water.

2. The process of claim 1 wherein said strong acid is sulfuric acid.

3. The process of claim 1 wherein said acid is hydrofluoric acid.

4. The process of claim 1 wherein said acid is phosphoric acid.

5. The process of claim 1 wherein said cellulose material is paper.

6. The process of claim 1 wherein said cellulose material is cotton.

7. A method comprising contacting said material with a solution comprising from about 50 percent to about 60 percent boron trifluoride, from about 8 percent to about 12 percent hydrofluoric acid, and from about 32 percent to about 39 percent water, and subsequently contacting said treated material with water.

8. A method comprising contacting said material with a solution comprising from about 5 percent to about 68 percent sulfuric acid, from about 75 percent to about 7 percent boron trifluoride, and from about 12 percent to about 40 percent water and subsequently contacting said treated material with water.

9. The process of claim 8 wherein said cellulose material is paper.

10. The process of claim 8 wherein said solution comprises about 46 percent sulfuric acid, about 22 percent boron trifluoride and about 32 percent water.

References Cited by the Examiner

UNITED STATES PATENTS

| | | | |
|---|---|---|---|
| 198,382 | 12/1877 | Hanna et al. | 8—119 |
| 420,615 | 2/1890 | Andrews | 8—118 |
| 543,986 | 8/1895 | Edison | 8—119 |
| 793,034 | 6/1905 | Kitsee | 8—119 |
| 1,140,253 | 5/1915 | Clifton | 8—119 |
| 2,516,083 | 7/1950 | Weiss | 8—118 |
| 2,554,439 | 5/1951 | Bock | 8—118 X |

NORMAN G. TORCHIN, *Primary Examiner.*

J. CANNON, *Assistant Examiner.*